United States Patent [19]

Sumiyoshi

[11] 3,958,271

[45] May 18, 1976

[54] TRACKING CONTROL CIRCUIT USING A DELAYED TACH SIGNAL

[75] Inventor: Koichiro Sumiyoshi, Tokyo, Japan

[73] Assignee: Sony Corporation, Tokyo, Japan

[22] Filed: Apr. 11, 1975

[21] Appl. No.: 567,051

Related U.S. Application Data

[63] Continuation of Ser. No. 411,415, Oct. 31, 1973, abandoned.

[30] Foreign Application Priority Data

Nov. 11, 1972  Japan............... 47-130036[U]

[52] U.S. Cl. .................................. 360/70; 360/75; 360/77; 318/314

[51] Int. Cl.² ............... G11B 21/04; G11B 21/10

[58] Field of Search ............... 360/70, 64, 75, 73, 360/77; 318/314, 318

[56] References Cited

UNITED STATES PATENTS

| | | | |
|---|---|---|---|
| 3,358,080 | 12/1967 | MacLeod | 360/70 |
| 3,384,708 | 5/1968 | Stosberg | 360/64 |
| 3,600,508 | 8/1971 | Dann | 360/70 |
| 3,662,098 | 5/1972 | Yano | 360/70 |
| 3,705,840 | 12/1972 | Kosugi | 360/70 |

Primary Examiner—Bernard Konick
Assistant Examiner—Alan Faber
Attorney, Agent, or Firm—Lewis H. Eslinger; Alvin Sinderbrand

[57] ABSTRACT

In a video tape recorder in which a video signal is recorded on a magnetic tape as a plurality of skewed tracks by a rotary magnetic head which is rotated in synchronism with a frame frequency signal contained in the video signal and in which a recorded video signal is reproduced by the rotary magnetic head from a magnetic tape on which a control signal representing the frame frequency has also been recorded, there is provided a detecting device which detects the time when the rotary magnetic head rotates in contact with the magnetic tape to a point beyond that corresponding to where the frame frequency signal in the video signal is recorded. The output signal from the detecting device is applied to a variable delay circuit. A signal obtained by phase-comparing the output signal from the delay circuit with a signal reproduced by a fixed magnetic head from the control signal recorded on the magnetic tape is used to control the rotating phase of the rotary magnetic head and/or a drive for moving the magnetic tape.

5 Claims, 16 Drawing Figures

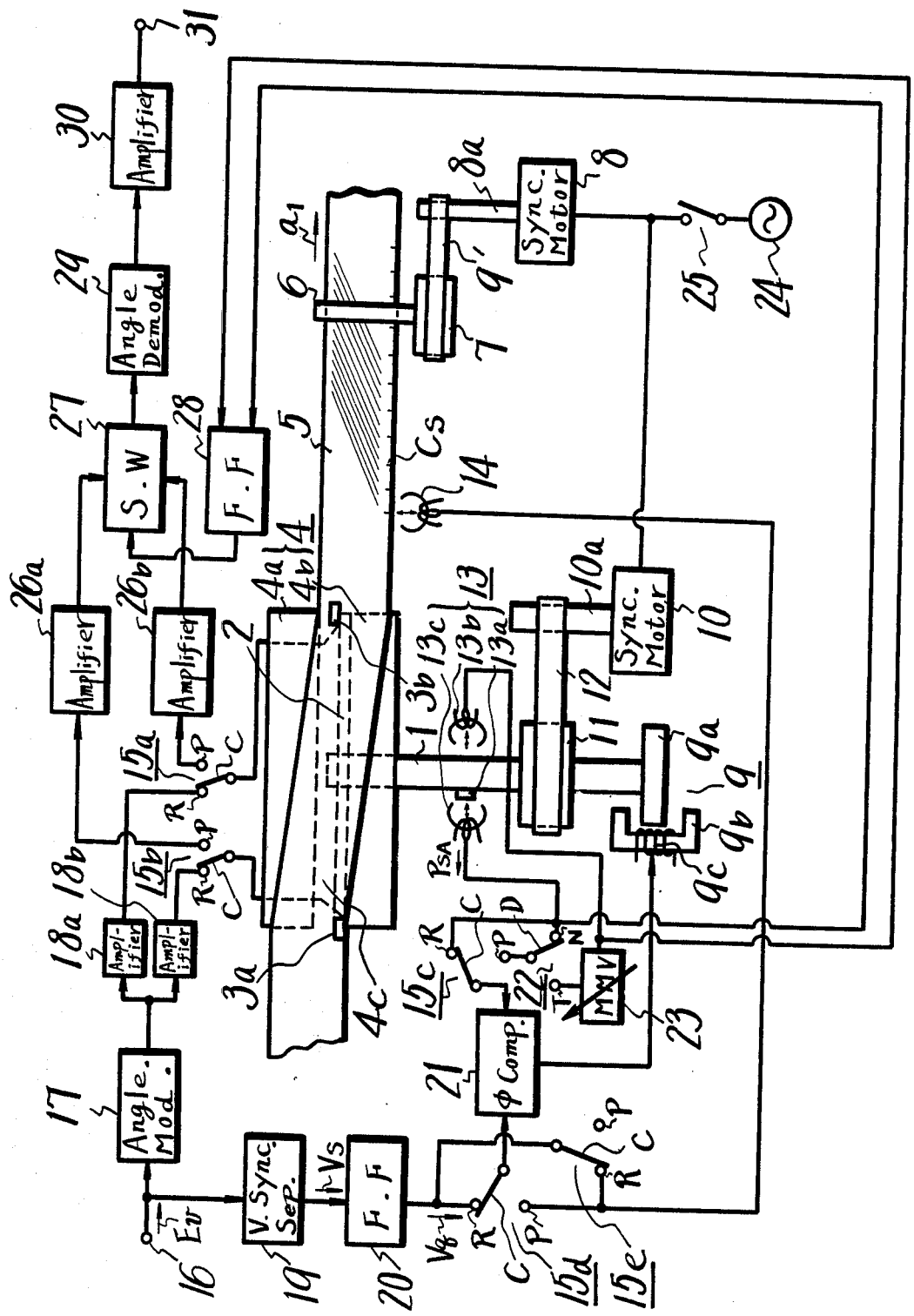

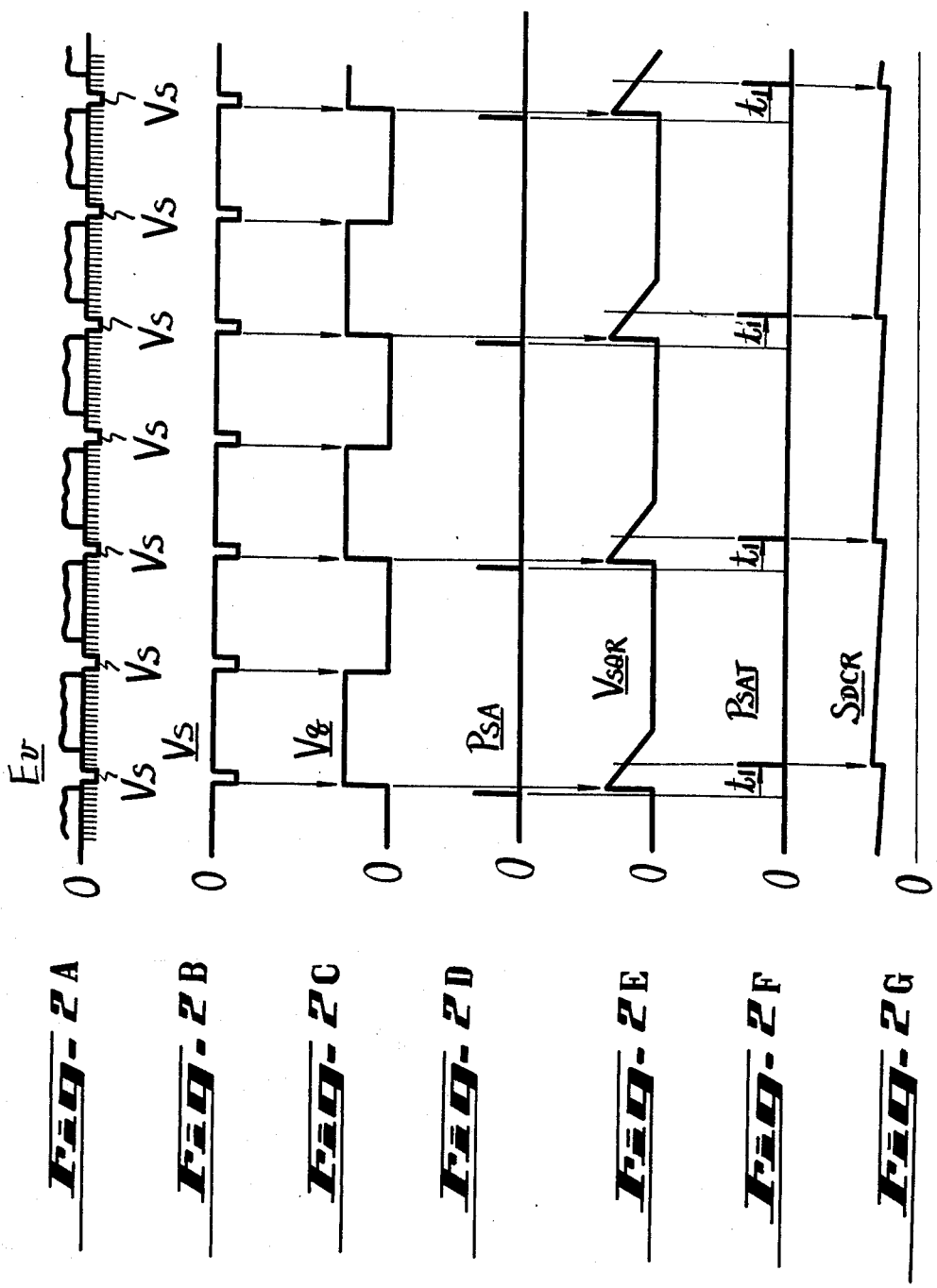

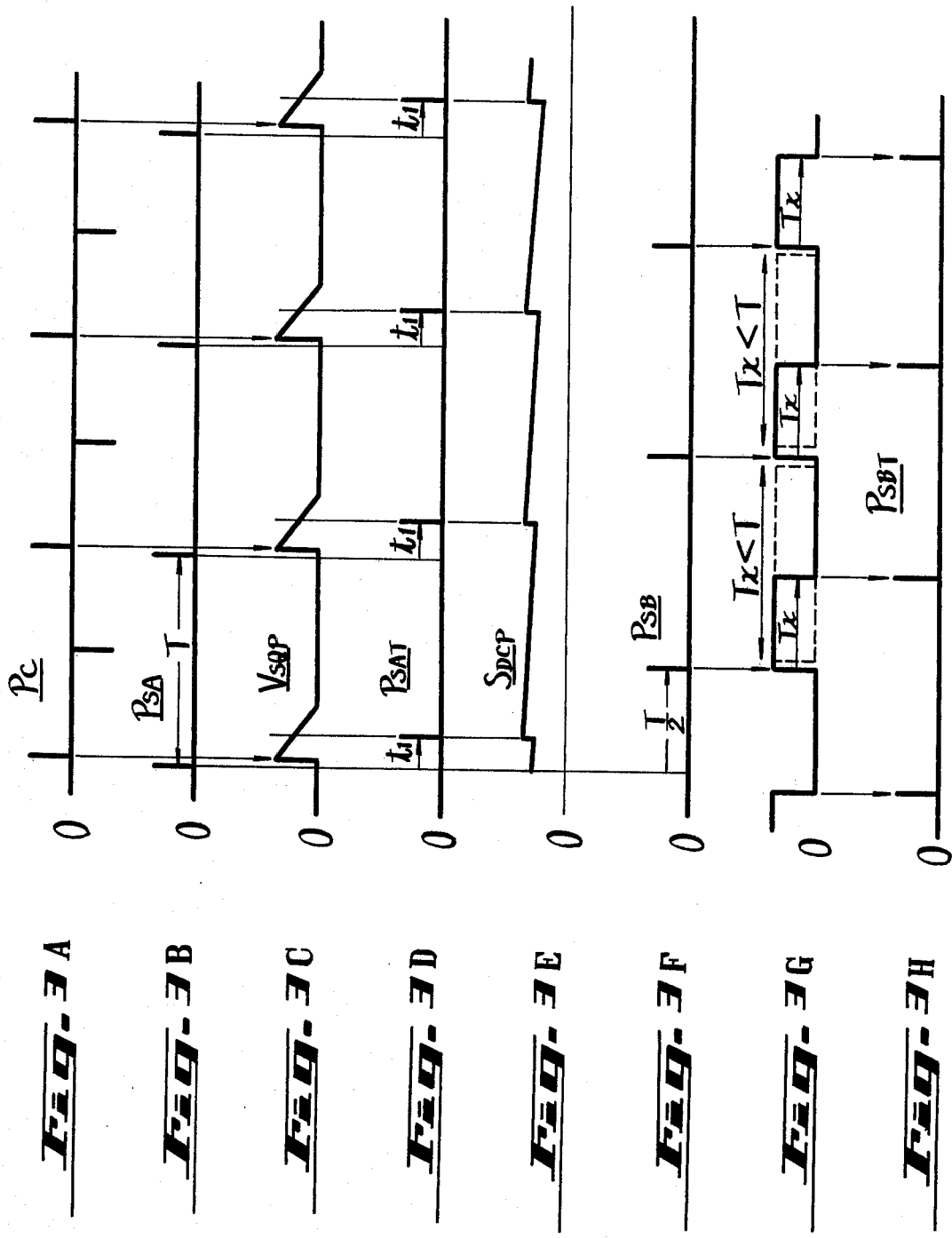

TRACKING CONTROL CIRCUIT USING A DELAYED TACH SIGNAL

This is a continuation of application Ser. No. 411,415, filed Oct. 31, 1973, now abandoned.

BACKGROUND OF THE INVENTION

1. Field of the Invention

The present invention relates generally to a video tape recorder and/or reproducer, and more particularly to an improved tracking control device and circuit for adjusting the tracking of a rotary head assembly during video signal reproduction.

2. Description of the Prior Art

A video tape recorder and/or reproducer, which records a video signal on a magnetic tape by a rotary magnetic head assembly and/or reproduces the video signal from the magnetic tape by the head assembly, is well known.

In such an apparatus, when the video signal is recorded, the rotation of the rotary magnetic head is phase locked to the vertical synchronizing signal contained in the video signal. Accordingly, it is necessary to adjust the phase of rotation of the rotary magnetic head assembly to attain phase lock. Similarly, when a video signal recorded on the magnetic tape is reproduced, the rotary magnetic head assembly must correctly trace or scan the recording track of the video signal on the magnetic tape. This is obtained by phase adjusting the rotation of the rotary magnetic head assembly or the driving of a capstan which drives or transports the magnetic tape.

To perform the above phase adjustment, it has been proposed to employ a pulse generator for indicating the position of the rotary magnetic head assembly. The pulse generator includes a pole piece which rotates with the rotary magnetic head assembly and a pick-up which senses the position of the pole piece when the rotary magnetic head assembly arrives at a predetermined position, for example, at a position where the head first contacts the magnetic tape. Further, there are provided a separator for separating the vertical synchronizing signal from the video signal when the latter is recorded, a phase comparator which detects the phase difference between the separated vertical synchronizing signal and the pulse signal produced by the pulse generator, a head assembly drive control for achieving a phase adjustment of the rotation of the rotary magnetic head in accordance with a phase control signal proportional to the phase difference detected by the phase comparator, and a control signal recording head for recording a control signal representing the separated vertical synchronizing signal on the magnetic tape.

When recording, the rotary magnetic head assembly is rotated in phase lock relation to the vertical synchronizing signal by the above apparatus and the vertical synchronizing signal or a signal in synchronous association therewith is recorded by the control signal recording head. When reproducing the video signal from the magnetic tape, a servo control operation is carried out such that the control signal recording head is used as a signal reproducing head to reproduce the control signal from the tape which is driven by a capstan. The reproduced control signal and a pulse signal produced by the pulse generator are both applied to the phase comparator, which, in turn, produces a phase control signal proportional to the phase difference between the reproduced control signal and the pulse signal to control the rotation of the rotary magnetic head assembly or the capstan so as to minimize the phase difference.

In practice, however, there are some instances during a signal reproduction operation when the rotary magnetic head can not precisely scan or trace the recording track of the video signal on the magnetic tape in response to the above servo control. Various causes can be considered for this defect. By way of example, the mounting position of the control signal recording and/or reproducing head of the recorder or reproducer may shift from a determined precise position, the magnetic tape having the video signal recorded thereon may expand or shrink since the signal had been recorded, and so on. Additionally, when a video signal has been recorded by a different video tape recorder, the rotary head often cannot accurately trace the pre-recorded signal tracks.

In order to avoid such defect and to provide that the rotary magnetic head correctly traces the recording track of the video signal on the tape, a prior art video tape recorder has included with a tracking adjustment means for the rotary magnetic head. Such tracking adjustment means includes a time delay means such as a monostable multivibrator inserted between the pulse generator and the phase comparator, the delay time of the delay means being changed manually, as is well known. In the prior art tracking adjustment means, the pulse signal from the pulse generator is supplied to a first time delay means to be delayed by a time interval $T_H$, the time required for the rotary magnetic head to be rotated by a half rotation, and the delayed pulse is then further supplied to a second time delay means to be further delayed by an interval $(T_H \pm T_H)$ or $0 \sim 2 T_H$, and the output signal from the second time delay means is fed to the phase comparator. Thus, the tracking adjustment is achieved by manually varying the delay time of the second time delay means. In other words, the prior art tracking adjustment is carried out in such a manner that the pulse signal from the pulse generator is delayed by a time longer or shorter than the time which is required for the rotary magnetic head to rotate one turn and the delayed pulse signal is thereafter applied to the phase comparator.

However, this prior art technique of tracking adjustment is accompanied by noticeable defects. The servo control apparatus, which provides for the rotary magnetic head to correctly trace the recording track of the video signal on the tape while a tracking adjustment is being carried out, operates on the assumption that a pulse signal is received from the pulse generator at a time less than one rotation time of the rotary magnetic head. Accordingly, even if any change of the rotation speed of the rotary magnetic head or the travelling speed of the tape occurs during one rotation time period of the rotary magnetic head, the servo control apparatus of the above type can not compensate for such a change in speed. As a result, noise may increase in the reproduced video signal due to incorrect trace. Also, in the prior art a monostable multivibrator is used as the time delay means because its delay time can be easily varied. However, in practice the recovery time of he monostable multivibrator may drift because of variations of power source voltage or ambient temperature, so that the tracking adjustment must be re-adjusted often. In accordance with the prior art technique it is very difficult to provide a desired delay time of the time delay means that is relatively free from the influence of drift in the recovery time of the monostable multivibrator. Further, the use of two monostable multivibrators connected in a cascade manner for obtaining the desired delay time results in a complex circuit requiring a larger number of adjustable elements.

SUMMARY OF THE INVENTION

An object of the present invention is to provide a video tape recorder and/or reproducer with an improved tracking adjustment free from the defects encountered in the prior art.

Another object of the invention is to provide a tracking adjustment device that is stable in operation.

A further object of the invention is to provide a tracking adjustment device which is especially simple in circuit construction.

A feature of the invention resides in that a time required for a rotary magnetic head to rotate by a certain angle is utilized as the delay time of a signal used for a tracking adjustment.

Another feature of the invention resides in that since the time required for the rotary magnetic head to rotate by the certain angle is used as the delay time for the signal, the delay time of the signal is not affected by temperature change and/or power source voltage variations.

Additional and other objects, features and advantages of the invention will be apparent from the forthcoming description taken in conjunction with the accompanying drawing.

BRIEF DESCRIPTION OF THE DRAWING

FIG. 1 is a schematic diagram for illustrating an embodiment of the present invention; and FIGS. 2A to 2G and 3A to 3H, inclusive, are waveform diagrams derived at various locations in the embodiment depicted in FIG. 1.

DESCRIPTION OF THE PREFERRED EMBODIMENT

An embodiment of the present invention will be hereinbelow described with reference to the drawings.

FIG. 1 depicts a portion of a videotape recorder/reproducer including a tape transport, wherein reference numeral 1 designates a rotary shaft and 2 a support member for magnetic recording and/or reproducing heads 3a and 3b. The support member 2 is attached at its center to the rotary shaft 1 and is rotated together with the rotary shaft 1. The magnetic heads 3a and 3b are attached to diametrically opposed outer portions of the support member 2 and are spaced apart by 180°. A tape guide drum 4 is formed of an upper tape guide drum member 4a and a lower tape guide drum member 4b. A clearance or gap 4c is formed between the upper and lower tape guide drum members 4a and 4b, and the magnetic heads 3a and 3b are slightly projected in the clearance 4c to the outer surfaces of the drum members 4a and 4b. Thus, the magnetic heads 3a and 3b are rotated in the clearance along the outer surface of the drum 4. A magnetic recording tape 5 is wound around the outer surface of the guide drum 4 inclined relative to the rotation trace of the magnetic heads 3a and 3b. In this embodiment, the magnetic tape 5 is wound around the guide drum 4 with a range between the pick up and take off points on the drum that is slightly larger than 180°.

In FIG. 1, reference numeral 6 designates a capstan, 7 a capstan flywheel attached to the capstan shaft, 8 a capstan motor and 9' a capstan drive belt which extends between the flywheel 7 and a rotary shaft 8a of the capstan motor 8 for driving the flywheel 7. The magnetic tape 5 is transported by the capstan 6, which is driven by the motor 8 in a left, to right direction (as indicated by arrow $a_1$) in FIG. 1 at a constant speed, for example, 9.53 cm/sec. Hence, the portion of the tape 5 wound on the drum 4 is transported in the same direction and at the same speed. A dynamic braking device 9 includes a rotor 9a attached to the rotary shaft 1 and a stator 9b which has wound thereon a brake coil 9c disposed in opposing relation to the rotor 9a. A head drum motor 10 drives the rotary shaft 1 through a belt 12 which extends between a rotary shaft 10a of the motor 10 and a rotary head pulley 11 attached to the rotary shaft 1. The head drum motor 10 and the capstan motor 8 are both, for example, synchronous motors.

In the embodiment of FIG. 1, when the dynamic braking device 9 is turned off, the rotary shaft 1 is driven by the motor 10 via the belt 12 at a speed slightly higher than 30 rps. A pulse generator 13 is provided which includes a magnetic pole piece 13a and pick-up or pulse generating heads 13b and 13c for detecting the rotational speed and angular position of the heads 3a and 3b. In the illustrated embodiment, the pole piece 13a is attached to the rotary shaft 1 and is rotated together with the heads 3a and 3b when the rotary shaft 1 is rotated the pulse generating heads 13b and 13c are positioned in such manner that the pole piece 13a intersects their magnetic fields to indicate the respective locations of the heads 3a and 3b and are thus spaced apart by an angular distance of 180°. A control signal recording and/or reproducing head 14 is provided to cooperate with the transported tape 5 to record and/or reproduce a control signal Cs(which will be described below) on and/or from the edge portion of the tape 5.

An electric circuit embodying the teachings of the present invention will be now described. Reference numerals 15a, 15b, 15c, 15d and 15e indicate single-pole double-throw switches each of which includes a movable contact C and a pair of fixed contacts R and P. All the switches 15a to 15e are, for example, ganged switches which are interlocked with one another and it will initially be assumed that each movable contact C of the switches 15a to 15e is switched to contact its fixed contact R in the illustrated embodiment. A composite video signal Ev is applied to a composite video signal input terminal 16 and then to an angle modulator 17 which angle-modulates the composite video signal Ev. The output signal from the angle modulator 17 is applied to record amplifiers 18a and 18b, respectively, the output terminals of which are connected to the fixed contacts R of the switches 15a and 15b, respectively. The output signal from the angle modulator 17 is amplified by the amplifiers 18a and 18 b to have a level sufficient for the video heads 3a and 3b to record the signal on the tape 5. The composite video signal Ev is further applied from the terminal 16 to a vertical synchronizing separator 19 which separates a vertical synchronizing signal Vs from the composite video signal Ev and applies the separated vertical synchronizing signal Vs to a flip-flop circuit 20. The flip-flop circuit 20 is triggered by the vertical synchronizing signal Vs at every arrival thereof and is thus changed from one stable state to the other stable state. Thus, the flip-flop circuit 20 produces a rectangular wave signal Vq at its output terminal. A phase comparator 21 is connected at its one input terminal to the movable contact c of the switch 15d and at its other input terminal to the movable contact c of the switch 15c and functions to comparate the phase difference between signals applied to its two input terminals and to produce an output signal which changes in magnitude in response to the phase difference between the two signals. The output signal from the comparator 21 is applied to the braking coil 9c of the dynamic braking device 9. A direct-coupled amplifier (not shown) may be provided to apply the output signal to the braking coil, if necessary. A tracking switch 22 of a single-pole double-throw type is provided. The switch includes a pair of fixed contacts T and N and a movable contact D selectively contactable with the fixed contacts T and N. A tracking control multivibrator or monostable multivibrator 23 is provided having a manually variable time delay. The time delay output terminal of the multivibrator 23 is connected to the fixed contact T of the switch 22 and the multivibrator input terminal is connected with the pick-up head 13b of the pulse generator. An amplifier (not shown) may be provided to couple the multivibrator to the pick-up head, if necessary. Hence an output pulse from the pick-up head 13b is applied to the multivibrator 23. The pick-up head 13c of the pulse generator 13 is connected to the fixed contact N of the switch 22 and to the fixed contact R of the switch 15c. An amplifier (not shown) may be provided to so couple the pick-up head 13c, if necessary. The movable contact D of the switch 22 is connected to the fixed contact P of the switch 15c. A conventional power source 24 is connected through a power switch 25 to the motors 8 and 10, respectively. The movable contact C of the switch 15b is connected to the head 3a and the movable contact C of the switch 15a is connected to the other head 3b. The fixed contact R of the switch 15d is connected to the output terminal of the flip-flop circuit 20 and also to the movable contact C of the switch 15e. The fixed contact P of the switch 15d is connected to the fixed contact R of the switch 15e and also to the control signal record/reproduce head 14. The fixed contact P of the switch 15e is not connected to further apparatus.

A playback circuit for the composite video signal, which is conventional in nature, will be now described briefly. In FIG. 1, reference numerals 26a and 26b indicate preamplifiers, 27 a playback signal gate switch which is typically a conventional electronic switch, 28 a flip-flop circuit or bistable multivibrator, 29 an angle demodulator or angle modulated signal detector, 30 a video amplifier, and 31 an output terminal for the composite video signal. The input terminal of the preamplifier 26a is connected to the fixed terminal P of the switch 15b, while the input terminal of the preamplifier 26b is connected to the fixed contact P of the switch 15a. The output terminals of the preamplifiers 26a and 26b are connected to the playback signal gate switch 27, the gate switch having a gate control signal input terminal which is connected to the output terminal of the flip-flop circuit 28 and a signal output terminal which is connected to the signal input terminal of the angle demodulator 29. The output terminal of the angle demodulator 29 is connected through the video amplifier 30 to the output terminal 31. The set and reset signal input terminals of the flip-flop circuit 28 are connected to the pick-up heads 13b and 13c of the pulse generator 13, respectively. A pulse forming network may be provided between the set (reset) signal input terminal of the flip-flop circuit 28 and the pulse generator 13, if necessary.

The operation of the embodiment shown in FIG. 1 will be now described with reference to FIG. 2.

For recording video signals onto the tape 5, the movable contact C of all the switches 15a to 15e are switched to contact the fixed contacts R thereof, respectively. The composite video signal Ev shown in FIG. 2A is applied to the input terminal 16 which is then applied to the angle modulator 17 to be modulated as an angle modulated video signal. The modulated video signal from the angle modulator 17 is fed to the record amplifiers 18a and 18b, respectively. The amplifiers 18a and 18b produce signals with frequency characteristics suitable to be fed to the magnetic heads, which signals are then fed, through the switches 15a and 15b, to the heads 3a and 3b, respectively. The video signal Ev is fed also to the vertical synchronizing separator 19 which produces the vertical synchronizing signal Vs such as shown in FIG. 2B which is then applied to the flip-flop circuit 20 to trigger the same at, for example, the trailing edge of the signal Vs. Thus, the flip-flop circuit 20 produces the rectangular wave signal Vq shown in FIG. 2C.

When the power switch 25 is turned on, the tape 5 is transported by the capstan 6 at a constant speed. Also the rotary shaft 1 and the support member 2 which carries the heads 3a and 3b are rotated at a constant speed, for example, 30 r.p.s. in accordance with the standards adopted in the United States and Japan. Immediately after the initial contact of the magnetic head 3a with the magnetic tape 5 which is wound on the outer surface of the tape guide drum 4, the pick-up head 13c produces a pulse $P_{SA}$ shown in FIG. 2D. The pulse $P_{SA}$ is fed to one input terminal of the phase comparator 21 through the switch 15c. The rectangular signal Vq from the flip-flop circuit 20 is fed through the switch 15d to the other input terminal of the phase comparator 21 and also to the control signal record/reproduce head 14 through the switch 15e. Thus, the control signal head 14 records the signal Vq on the tape 5 as the control signal Cs, as shown in FIG. 1. The signal Vq applied to the phase comparator 21 is converted to a sawtooth wave signal $V_{SQR}$ which rises up at the leading edge of the signal Vq as shown in FIG. 2E. The pulse $P_{SA}$ also applied to the comparator 21 is converted to a pulse signal $P_{SAT}$ which is delayed by a time interval $t_1$ as shown in FIG. 2F. The pulse signal $P_{SAT}$ is used for sampling the sawtooth wave signal $V_{SQR}$. The level of the sampled output signal obtained by the sampling process is proportional to the phase difference between the synchronizing signal Vs and the pulse signal $P_{SA}$. The output signal is applied as a phase control signal to the dynamic braking device 9. Thus, the dynamic braking device 9 is controlled in accordance with the sampled output signal to synchronize the rotation of magnetic head 3a with the sync. signal Vs. Accordingly, every field of the video signal Ev is sequentially recorded on the tape 5 as a skewed track. That is, during the time interval when the rotary shaft 1 is rotated one revolution, the signals corresponding to two fields or one frame of the video signal Ev are recorded on the tape 5 as two skewed tracks. In practice, the phase control signal fed to the dynamic braking device 9 is a direct current signal $S_{DCR}$ shown in FIG. 2G which is obtained by averaging the sampled output signal derived from the comparator 21 through, for example a sample and hold circuit (not shown).

The reproducing operation of the embodiment shown in FIG. 1 will now be described with reference to FIG. 3. When the signal recorded on the tape 5 is to be reproduced, the movable contacts c of all the switches 15a to 15e are switch to contact their fixed contacts P, respectively, and the movable contact D of the tracking switch 22 is switched to contact its fixed contact N.

When the power switch 25 is turned on, the tape 5 is transported by the capstan 6 at a constant speed and the rotary shaft 1 secured to the support member 2 which carries the heads 3a and 3b is also rotated at a predetermined rotational speed. As the tape passes the control signal record/reproduce head 14, the head reproduces a control signal Pc shown in FIG. 3A which is a reproduction of the control signal Cs. The control signal Pc is applied to one of the signal input terminals of the phase comparator 21 through the switch 15d, and the pulse produced by the pick-up head 13c upon detecting the polepiece 13a as described above (refer to FIG. 3B) is applied from the head 13c to the other signal input terminal of the phase comparator 21 through the fixed contact N of the tracking switch 22, its movable contact D, the fixed contact P of the switch 15c and its movable contact C. In the signal reproduction operation, the signal Pc is converted to a sawtooth wave signal $V_{SQP}$ (refer to FIG. 3C) that is the same as the signal $V_{SQR}$ upon recording. The rising up of the signal $V_{SQP}$ is made to coincide with the positive going pulse of the signal Pc. The pulse $P_{SAT}$ (refer to FIG. 3D) which is delayed from the pulse $P_{SA}$ by the time interval $t_1$ is similar to the delayed pulse of FIG. 2F produced during recording. The pulse obtained by sampling the signal $V_{SQP}$ with the pulse $P_{SAT}$ is applied to an integrator circuit or a sample and hold circuit (not shown) which then produces a direct current signal $S_{DCP}$ shown in FIG. 3E. If the signal $S_{DCP}$ is fed to the dynamic braking device 9 as a phase control signal, the braking action by the device 9 is increased as the phase of the pulse $P_{SA}$ is in phase leading relation with respect to that of the pulse Pc, but the braking action by the device 9 is reduced as the phase of the pulse $P_{SA}$ is in phase lagging relation with respect to that of the pulse Pc. As a result, the rotary shaft 1 is rotated in phase-lock relation with the pulse Pc and hence the heads 3a and 3b can trace the recording tracks of the video signal on the tape 5 accurately.

The angle modulated video signals reproduced by the heads 3a and 3b from the tape 5 are fed through the preamplifiers 26a and 26b to the gate switch 27, respectively. The gate switch 27 is switched by the flip-flop circuit 28 which is set (or reset) by a pulse $P_{SB}$ produced by the pick-up head 13b of the pulse generator 13 and is reset (or set) by the pulse $P_{SA}$ produced by the pick-up head 13c. Thus, the gate switch 27 successively passes alternate angle modulatd video signals from the heads 3a and 3b to thereby reproduce a continuous angle modulated video signal which is then applied to the angle demodulator 29 and demodulated as a composite video signal. The demodulated composite video signal is supplied through the amplifier 30 to the output terminal 31. If television monitor equipment is connected to the output terminal 31, a video picture will be formed on the viewing screen of the monitor in accordance with the recovered video signal.

When a video signal is reproduced from a tape on which the video signal has been recorded by another video recorder, noise ("snow") may appear in the reproduced video picture, which is caused by that fact that the heads 3a and 3b do not trace the tracks on the tape 5 correctly, as mentioned above, even though the heads are apparently synchronized with the recorded control signal CS. In order to avoid this occurrence, the improved tracking adjustment means of the present invention is provided. The movable contact D of the tracking switch 22 is switched to contact the fixed contact T. The movable contacts of the switches 15a to 15e are maintained in contact with the fixed contacts P. Accordingly, the output terminal of the tracking control multivibrator 23 is connected to one of the signal input terminals of the phase comparator 21 through the fixed contact T of the tracking switch 22, its movable contact D, the fixed contact P of the switch 15c and its movable contact C. In this configuration, the pulse $P_{SA}$ from the pick-up head 13c of the pulse generator 13 is not supplied to the phase comparator 21. However, the input terminal of the multivibrator 23 is connected to the pick-up head 13b and is thus supplied with the pulse $P_{SB}$ produced by the head. The pulse $P_{SB}$ together with the pulse $P_{SA}$ are used to set and reset the flip-flop circuit 28 and the flip-flop 28 acts to control the gate switch 27 as described above. Thus, since the respective pick-up heads 13b and 13c are spaced apart by an angular distance of 180°, then, as shown in FIG. 3F, the pulse $P_{SB}$ is obtained from the head 13b at a time delayed (or advanced) from the pulse $P_{SA}$ by ½T where T is the time period of the pulses $P_{SA}$ produced by the head 13c. The pulse $P_{SB}$ is applied to the multivibrator 23 to trigger the monostable multivibrator and hence to change it to an unstable state. The monostable multivibrator transferred to the unstable state returns to its stable state after a certain time interval Tx. Thus, the monostable multivibrator produces an output waveform signal as shown by the solid line in FIG. 3G. It may be apparent that the time interval Tx can be varied over a range of, for example, $O < Tx < T$ as shown by the dotted line in FIG. 3G by varying the recovery time of the monostable multivibrator. If the monostable multivibrator produces a pulse $P_{SBT}$ upon changing from its unstable state to its stable state shown in FIG. 3H, the pulse $P_{SBT}$ can be delayed or advanced relative to the pulse $P_{SA}$ by varying the recovery time of the monostable multivibrator. Therefore, when the movable contact D of the switch 22 is switched to contact if the fixed contact T, if the pulse $P_{SBT}$ is fed to the fixed contact T of the switch 22 as the output signal of the tracking control multivibrator 23 and the trace positions of the heads 3a and 3b relative to the recording tracks of the video signal on the tape 5 can be advanced in to the same direction same as the tape transport direction or in an opposite direction by manually varying the recovery time of the monostable multivibrator. In other words, the heads 3a and 3b can be adjusted in response to a manual operation so as to trace the tracks accurately.

Since well-known circuits are available for manually varying the recovery time of the monostable multivibrator in this invention, the description of such circuits will be omitted for the sake of brevity.

In the embodiment of FIG. 1, during a video signal reproduction operation the reproduced control signal derived from the prerecorded control signal Cs and the pulse $P_{SA}(P_{SB})$ produced by the pulse generator 13 are used to control the phase of the rotation of the rotary shaft 1. However this invention need not be limited to this example. Alternatively this invention can be applied to an embodiment where, during reproduction operation the rotary shaft is rotated at a predetermined rotational speed (30 r.p.s.), and the reproduced signal recovered from the recorded signal Cs and the pulse $P_{SA}(P_{SB})$ are used to control the rotational phase of the capstan to thereby control the movement of the tape.

As may be apparent from the above description, with this invention the time which is required for the head $3a$ ($3b$) to rotate by a predetermined angle, for example, 180° is used part of the signal delay time which is necessary to carry out the tracking adjustment. Hence, the circuit required for providing the time delay is simplified.

In a prior art tracking adjustment system, two monostable multivibrators connected in cascade are used to provide the time delay. However, in the present invention only one monostable multivibrator is employed and hence the tracking adjustment is less influenced by variations in power source voltage, ambient temperature or the like.

Further, in this invention the pick-up head $13b$ is provided as a signal source for controlling the playback signal gate switch 27, as shown in FIG. 1, thereby greatly simplifying the construction of the present apparatus as compared with the prior art.

While, the above detailed description has shown, described and pointed out the fundamental novel features of the invention as applied to a preferred embodiment, it will be understood that various omissions, substitutions and changes in the form and details of the illustrated apparatus may be made by those skilled in the art without departing from the spirit and scope of the invention. The invention, therefore, is to be limited only as indicated by the scope of the following claims.

I claim as my invention:

1. A video tape recorder in which a video signal is recorded on a magnetic tape as a plurality of skewed tracks by a rotary magnetic head which is rotated in synchronism with a frame frequency signal contained in the video signal and in which a recorded video signal is reproduced by the rotary magnetic head from the magnetic tape on which a control signal synchronized with the frame frequency is recorded comprising:

a. first and second rotary magnetic heads mounted on a support member and spaced apart by 180° and a tape guide drum for guiding the magnetic tape about the surface of the drum so that the rotary magnetic heads scan the tape;
   b. a capstan for transporting the magnetic tape about the drum;
   c. means for driving the capstan and head driving means for driving the rotary magnetic head;
   d. a control signal magnetic head operable during a signal recording operation to record said control signal onto said magnetic tape and operable during a signal reproducing operation to reproduce the control signal from the magnetic tape;
   e. a first transducer for detecting the position of the rotary magnetic heads and for generating an output signal when one of the rotary magnetic heads rotates into an initial tape contact position whereat the rotary magnetic head arrives proximate a recorded area corresponding to that associated with a reproduced control signal; and a second transducer angularly displaced from said first transducer by a predetermined amount for detecting the position of the rotary magnetic head and for generating a second output signal time displaced from said first output signal when the other rotary magnetic head is rotated into an initial tape contact position;
   f. variable delay means connected to said second transducer for imparting a selectively variable time delay to the second output signal, the total time delay imparted to said second output signal being no greater than the time separating said first and second output signals;
   g. phase comparator means for determining the phase difference between signals applied thereto, said phase comparator means including a first input and a second input;
   h. manually operable switch means operable during a signal recording operation to supply the phase comparator means with a signal synchronized with the frame frequency signal contained in a received video signal and to couple the first transducer to the phase comparator means, and operable during a signal reproducing operation in a first mode to couple the control signal magnetic head and the first transducer to the phase comparator, and being further operable during a signal reproducing operation in a second mode to couple the control signal magnetic head and the variably delayed second output signal to the phase comparator; and
   i. phase control means for adjusting the driving phase of at least one of said driving means in accordance with the output signal produced by the phase comparator means.

2. The apparatus of claim 1, wherein said switch means comprises a first switch having a first condition for supplying said frame frequency synchronized signal to said phase comparator means first input and a second condition for supplying said reproduced control signal to said phase comparator means first input; and a second switch having a first condition for supplying said first output signal to said phase comparator means second input and a second condition for supplying said time delayed second output signal to said phase comparator means second input.

3. The apparatus of claim 2 wherein said delay means comprises monostable multivibrator means having a variable time delay.

4. The apparatus of claim 3 wherein said first and second transducers comprise means rotatable with the rotary heads; a magnetic pole piece fixed to and rotatable with said last-mentioned means; and a pair of pick-up heads disposed in sensing relation with respect to the rotating pole piece for generating first and second signals, respectively, when the pole piece rotates therepast; the pair of pick-up heads being angularly spaced apart by 180°.

5. A video tape recorder as claimed in claim 1 further including a playback signal gate switch for alternately gating the reproduced video signal from the first rotary magnetic head and the reproduced video signal from the second rotary magnetic head, the playback signal gate switch being triggered by the first and second pulses generated by the first and second pulse generating means, respectively.

* * * * *